United States Patent
Wang et al.

(10) Patent No.: US 12,453,720 B2
(45) Date of Patent: Oct. 28, 2025

(54) APPLICATION OF NORHARMANE IN IMPROVING ANTIBACTERIAL ACTIVITY OF ANTIBIOTICS

(71) Applicant: ZHEJIANG UNIVERSITY OF TECHNOLOGY, Zhejiang (CN)

(72) Inventors: Hong Wang, Zhejiang (CN); Jianwei Chen, Zhejiang (CN); Yaojia Lu, Zhejiang (CN); Huawei Zhang, Zhejiang (CN); Bin Wei, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 915 days.

(21) Appl. No.: 17/639,003

(22) PCT Filed: Jun. 4, 2021

(86) PCT No.: PCT/CN2021/098234
§ 371 (c)(1),
(2) Date: Feb. 28, 2022

(87) PCT Pub. No.: WO2021/249289
PCT Pub. Date: Dec. 16, 2021

(65) Prior Publication Data
US 2022/0304988 A1    Sep. 29, 2022

(30) Foreign Application Priority Data
Jun. 12, 2020  (CN) .......................... 202010532374.3

(51) Int. Cl.
*A61K 31/437* (2006.01)
*A61K 31/407* (2006.01)
*A61K 31/5383* (2006.01)
*A61K 38/12* (2006.01)
*A61P 31/04* (2006.01)

(52) U.S. Cl.
CPC .......... *A61K 31/437* (2013.01); *A61K 31/407* (2013.01); *A61K 31/5383* (2013.01); *A61K 38/12* (2013.01); *A61P 31/04* (2018.01)

(58) Field of Classification Search
CPC ................................................... A61K 31/437
See application file for complete search history.

(56) References Cited

PUBLICATIONS

Mensa, Rev Esp Quimioter 2018;31(1): 78-100.*
Lee, Phytomedicine. Dec. 1, 2017:36:254-261.*
Seo, Journal of Applied Poultry Research vol. 28, Issue 3, Sep. 1, 2019, pp. 761-770.*

* cited by examiner

*Primary Examiner* — Nizal S Chandrakumar
(74) *Attorney, Agent, or Firm* — MUNCY, GEISSLER, OLDS & LOWE, P.C.

(57) ABSTRACT

The present invention discloses an application of norharmane in improving activity of an antibiotic in resisting bacteria, when norharmane of the present invention is combined with polymyxin B, imipenem-cilastatin sodium or levofloxacin, it can enhance antibacterial activity of the antibiotic against drug-resistant *Pseudomonas aeruginosa*, produce a synergistic antibacterial effect, and significantly improves the killing ability of antibiotics against drug-resistant *Pseudomonas aeruginosa* to reduce the amount of antibiotics needed for achieving the same therapeutic effect, thereby providing a research direction for the development of new drugs and new use of old drugs.

3 Claims, 7 Drawing Sheets
Specification includes a Sequence Listing.

APPLICATION OF NORHARMANE IN IMPROVING ANTIBACTERIAL ACTIVITY OF ANTIBIOTICS

TECHNICAL FIELD

The present invention relates to the field of pharmacy, in particular to an application of norharmane in improving antibacterial activity of antibiotics.

BACKGROUND ART

Since the discovery of penicillin in 1928, the discovery and use of antibiotics have played a huge role in promoting human health and social progress. However, since the end of the 1970s, the development of new antibiotics has gradually slowed down, and no more antibiotics with completely new structure have been marketed since 1984. Correspondingly, antimicrobial resistance is alarmingly increasing. Infections caused by drug-resistant bacteria appear worldwide, and the infection rate is on the rise. Resistance to clinical antibiotics of various structural types has appeared successively, and the speed has exceeded the current speed of developing new antibiotics. And these super broad-spectrum drug-resistant bacteria are a serious threat to human life and health. The rapid evolution of bacterial resistance and the worrisomely tedious development of new drugs have prompted people to turn their attention to searching for alternative new antimicrobials and studying combinations of existing drugs.

Norharmane is a compound that has activity of inhibiting quorum sensing system of drug-resistant *Pseudomonas aeruginosa*. It can inhibit expression of bacteria-related virulent factors directly and weaken virulence of bacteria to make them reduce or lose the ability to damage the host without inhibiting the growth of bacteria. It can be used as an auxiliary therapeutic agent of antibiotics to achieve the purpose of preventing bacterial infections. The present invention combines it with an antibiotic, which is polymyxin B, imipenem-cilastatin sodium or levofloxacin, thereby significantly improving the killing ability of antibiotics against drug-resistant *Pseudomonas aeruginosa*, and meanwhile it greatly reduce the amount of antibiotics needed for achieving the same therapeutic effect.

SUMMARY OF THE INVENTION

The object of the present invention is to provide an application of norharmane in improving antibacterial activity of an antibiotic to overcome the current bacterial resistance problem.

The present invention adopts a technical solution as follows:

The present invention provides an application of norharmane in improving activity of an antibiotic in resisting bacteria, and the application is as follows: the norharmane is combined with the antibiotic to inhibit bacterial activity; the antibiotic includes one of polymyxin B, imipenem-cilastatin sodium and levofloxacin.

The structural formula of the norharmane is as follows:

A strain of the bacteria is drug-resistant *Pseudomonas aeruginosa*, preferably is *Pseudomonas aeruginosa* C218, which is preserved in Guangdong Microbial Culture Collection Center, preservation number is GDMCC No: 61027, and preservation date is May 13, 2020.

Further, the volume of the antibiotic calculated by the weight of the norharmane is 2-16 mL/μg, more preferably the volume of the polymyxin B calculated by the weight of the norharmane is 16 mL/μg; the volume of the imipenem-cilastatin sodium calculated by the weight of the norharmane is 2 mL/μg; and the volume of the levofloxacin calculated by the weight of the norharmane is 16 mL/μg.

In the present invention, the minimum inhibitory concentrations of norharmane and polymyxin B in combination are 0.63 μg/mL and 1.95 μg/mL, respectively. The minimum inhibitory concentrations of norharmane and imipenem-cilastatin sodium in combination are 0.63 μg/mL and 62.5 μg/mL, respectively. The minimum inhibitory concentrations of norharmane and levofloxacin in combination are 0.63 μg/mL and 15.6 μg/mL, respectively. Results show that each of combination of norharmane of not less than 0.63 μg/mL and polymyxin B of not less than 1.95 μg/mL, combination of norharmane of not less than 0.63 μg/mL and imipenem-cilastatin sodium of not less than 62.5 μg/mL, and combination of norharmane of not less than 0.63 μg/mL and levofloxacin of not less than 15.6 μg/mL has a synergistic effect against drug-resistant *Pseudomonas aeruginosa*.

In the present invention, drug-resistant *Pseudomonas aeruginosa* cells are used for research, and microdilution checkerboard method is used to determine antibacterial activity of norharmane in combination with the antibiotic which is polymyxin B, imipenem-cilastatin sodium or levofloxacin, at the same time FICI method and ΔE method are used to select the best concentrations of drugs in combination and evaluate the combined effect of the drugs. Results show that norharmane combined with polymyxin B, imipenem-cilastatin sodium or levofloxacin has a synergistic effect against drug-resistant *Pseudomonas aeruginosa* in vitro, and the effect is distinct. Low-dose norharmane can reduce the MIC value of polymyxin B against drug-resistant *Pseudomonas aeruginosa* from 7.8 μg/mL to 1.95 μg/mL, can reduce the MIC value of imipenem-cilastatin sodium against drug-resistant *Pseudomonas aeruginosa* from 2000 μg/mL to 62.5 μg/mL, and can reduce the MIC value of levofloxacin against drug-resistant *Pseudomonas aeruginosa* from 62.5 μg/mL to 15.6 μg/mL. The above findings provide thoughts for clinical combination of drugs as a treatment for drug-resistant bacterial infections.

Compared with prior art, advantages of the present invention are embodied in:

1. When norharmane of the present invention is combined with polymyxin B, imipenem-cilastatin sodium or levofloxacin, it can enhance antibacterial activity of the antibiotic against drug-resistant *Pseudomonas aeruginosa*, produce a synergistic antibacterial effect, and reverse the resistance of drug-resistant *Pseudomonas aeruginosa* to the antibiotic, thereby providing a research direction for the development of new drugs and new use of old drugs. For drug-resistant *Pseudomonas aeruginosa*, combination of drugs can significantly reduce the minimum inhibitory concentration of the antibiotic, combination of 1.95 μg/mL polymyxin B and 0.63 μg/mL norharmane, combination of 62.5 μg/mL imipenem-cilastatin sodium and 0.63 μg/mL norharmane, and combination of 15.6 μg/mL levofloxacin and 0.63 μg/mL norharmane all can kill more than 80% of the bacteria, and the higher the concentration is the stronger the effect is.

2. Norharmane is a compound that has the activity of inhibiting quorum sensing system of drug-resistant *Pseudomonas aeruginosa*. It can inhibit the expression of bacteria-related virulence factors without inhibiting the growth of bacteria, thereby weakening the virulence of the bacteria; and combination of norharmane with polymyxin B, imipenem-cilastatin sodium or levofloxacin can delay or prevent *Pseudomonas aeruginosa* from developing resistance to polymyxin B, imipenem-cilastatin sodium or levofloxacin.

3. To obtain the same antibacterial effect, combination of norharmane with polymyxin B, imipenem-cilastatin sodium or levofloxacin can greatly reduce the dosage of polymyxin B, imipenem-cilastatin sodium or levofloxacin, thereby reducing the adverse reactions of the corresponding drug.

SPECIFIC EMBODIMENTS

The present invention will be further described in conjunction with the specific examples.

Example 1: Antibacterial Effect Evaluation of Norharmane and an Antibiotic in Combination 1. Materials
1.1 Medicine and Reagent
Norharmane, Shanghai TopScience Co., Ltd.;
Polymyxin B, TCI (Shanghai) Development Co., Ltd.;
Imipenem-cilastatin sodium, Zhuhai United Laboratories Co., Ltd.;
Levofloxacin, TCI (Shanghai) Development Co., Ltd.;
Ofloxacin, Shanghai Canspec Scientific Instruments Co., Ltd.;
Methanol, Shanghai Lingfeng Chemical Reagents Co., Ltd.;
Sodium chloride, Shanghai NO. 4 Reagent & H.V. Chemical Co., Ltd.;
Sodium hydroxide, Shanghai NO. 4 Reagent & H.V. Chemical Co., Ltd.;
Peptone, Becton, Dickinson and Company;
Yeast extract, Becton, Dickinson and Company;
Agar powder, Becton, Dickinson and Company;
Norharmane mother liquor: norharmane was dissolved in methanol to prepare 5000 μg/mL mother liquor. Polymyxin B, imipenem-cilastatin sodium, levofloxacin and ofloxacin were respectively dissolved in methanol to prepare 8000 μg/mL mother liquors. All the mother liquors were stored in a refrigerator at −20° C. for use.

Medium:
(1) LB medium: for 1 L LB medium, 10 g of NaCl, 10 g of peptone, 5 g of yeast powder and water as the solvent were mixed well, a 1 mol/L NaOH solution was used to adjust the pH to about 7.2±0.2 at 25° C., the resulting solution was aliquoted into 250 mL conical flasks, sterilized at 121° C., $1\times10^5$ Pa for 20 min, and then stored for use.

(2) LB agar medium: for 1 L LB agar solid medium, 10 g of NaCl, 10 g of peptone, 5 g of yeast powder and water as the solvent were mixed well, agar powder was added with a final mass concentration of 1.5%-2.0%, a 1 mol/L NaOH solution was used to adjust the pH to about 7.2±0.2 at 25° C., the resulting solution was sterilize at 121° C., $1\times10^5$ Pa for 20 min, and then subjected to pouring plates for use.

1.2 Apparatus
SW-CJ-IFB clean bench, Suzhou Purification Equipment Co., Ltd.
LS-B50L vertical pressure steam sterilizer, Shanghai Boxun Medical Biological Instrument Co., Ltd.
SPX-250B-Z biochemical incubator, Shanghai Boxun Industry Co., Ltd.
ZHWY-2102C constant temperature culture oscillator, Shanghai Zhicheng Analytical Instruments Manufacturing Co., Ltd.
YP202N electronic balance, Shanghai Precision Scientific Instrument Corporation
RL203 electronic balance, Mettler-Toledo Instruments (Shanghai) Co., Ltd.
DELTA320 Benchtop pH meter, Mettler-Toledo Instruments (Shanghai) Co. Ltd.
Multiskan MK3 Microplate reader, Thermo Fisher Scientific Co. Ltd.

1.3 Experimental Strain
Experimental strain: The drug-resistant strain C218 was clinically isolated from the Second Affiliated Hospital, School of Medicine, Zhejiang University.

Identification of the strain C218: The experimental strain C218 was cultured on LB agar medium at 37° C. for 24 hours. The colony was green or yellowish green and its surface had metallic luster, and the medium turned yellowish green. The strain C218 was analyzed by 16SrDNA gene and compared with data in NCBI ribosomal RNA sequence (Bacteria and Archaea) database using NCBI Blast program. The strain C218 is identified as *Pseudomonas aeruginosa* and named as *Pseudomonas aeruginosa* C218 which is preserved in Guangdong Microbial Culture Collection Center, the preservation number is GDMCC No: 61027, the preservation date is May 13, 2020. the address is Guangdong Institute of Microbiology, No. 59 Building, No. 100 Xianliezhong Road, the postal code is 510075. The gene sequence was sequenced as follows:

```
CCTTGCGGTTAGACTAGCTACTTCTGGAGCAACCCACTCCCATGGTGT

GACGGGCGGTGTGTACAAGGCCCGGGAACGTATTCACCGTGACATTCT

GATTCACGATTACTAGCGATTCCGACTTCACGCAGTCGAGTTGCAGAC

TGCGATCCGGACTACGATCGGTTTTATGGGATTAGCTCCACCTCGCGG

CTTGGCAACCCTTTGTACCGACCATTGTAGCACGTGTGTAGCCCTGGC

CGTAAGGGCCATGATGACTTGACGTCATCCCCACCTTCCTCCGGTTTG

TCACCGGCAGTCTCCTTAGAGTGCCCACCCGAGGTGCTGGTAACTAAG

GACAAGGGTTGCGCTCGTTACGGGACTTAACCCAACATCTCACGACAC

GAGCTGACGACAGCCATGCAGCACCTGTGTCTGAGTTCCCGAAGGCAC

CAATCCATCTCTGGAAAGTTCTCAGCATGTCAAGGCCAGGTAAGGTTC
```

```
-continued
TTCGCGTTGCTTCGAATTAAACCACATGCTCCACCGCTTGTGCGGCC

CCCGTCAATTCATTTGAGTTTTAACCTTGCGGCCGTACTCCCCAGGCG

GTCGACTTATCGCGTTAGCTGCGCCACTAAGATCTCAAGGATCCCAAC

GGCTAGTCGACATCGTTTACGGCGTGGACTACCAGGGTATCTAATCCT

GTTTGCTCCCCACGCTTTCGCACCTCAGTGTCAGTATCAGTCCAGGTG

GTCGCCTTCGCCACTGGTGTTCCTTCCTATATCTACGCATTTCACCGC

TACACAGGAAATTCCACCACCCTCTACCGTACTCTAGCTCAGTAGTTT

TGGATGCAGTTCCCAGGTTGAGCCCGGGGATTTCACATCCAACTTGCT

GAACCACCTACGCGCGCTTTACGCCCAGTAATTCCGATTAACGCTTGC

ACCCTTCGTATTACCGCGGCTGCTGGCACGAAGTTAGCCGGTGCTTAT

TCTGTTGGTAACGTCAAAACAGCAAGGTATTAACTTACTGCCCTTCCT

CCCAACTTAAAGTGCTTTACAATCCGAAGACCTTCTTCACACACGCGG

CATGGCTGGATCAGGCTTTCGCCCATTGTCCAATATTCCCCACTGCTG

CCTCCCGTAGGAGTCTGGACCGTGTCTCAGTTCCAGTGTGACTGATCA

TCCTCTCAGACCAGTTACGGATCGTCGCCTTGGTAGGCCTTTACCCCA

CCAACTAGCTAATCCGACCTAGGCTCATCTGATAGCGTGAGGTCCGAA

GATCCCCCACTTTCTCCCTCAGGACGTATGCGGTATTAGCGCCCGTTT

CCGGACGTT
```

Preparation of bacterial solution: *Pseudomonas aeruginosa* GDMCC No: 61027 stored at −80° C., was thawed at room temperature, streaked on LB agar medium and cultured at 37° C. for 24 h, and then a single well-developed colony was inoculated again and cultured for 24 h at 37° C. to ensure that the strain was in the growth phase. A single colony was selected, inoculated into LB medium, and cultured at 37° C. and 200 rpm. for 16 h. The resulting solution was diluted 10000 times with fresh LB medium to obtain *Pseudomonas aeruginosa* GDMCC No:61027 bacterial solution whose concentration calculated by of the amount of bacterial viable count was $2.6 \times 10^9$ CFU/mL.

2. Contents and Methods 2.1 Determination of Combined Effect of Norharmane and Polymyxin B, Imipenem-Cilastatin Sodium or Levofloxacin on Resisting Drug-Resistant *Pseudomonas aeruginosa*

According to the checkerboard microdilution method, the norharmane mother liquor was diluted 4 times with methanol, and the concentration ranges of norharmane and an antibiotic (polymyxin B, imipenem-cilastatin sodium or levofloxacin) in combination were screened.

Methanol was used as a diluent, the preparation concentrations of norharmane were 160, 80, 40, 20, 10, 5 and 2.5 µg/mL, the preparation concentrations of polymyxin B were 31.25, 15.6, 7.8, 3.9, 1.95, 0.98 and 0.49 µg/mL; the preparation concentrations of imipenem-cilastatin sodium were 8000, 4000, 2000, 1000, 500, 250 and 125 µg/mL; the preparation concentrations of levofloxacin were 250, 125, 62.5, 31.25, 15.6, 7.8 and 3.9 µg/mL; and the preparation concentrations of ofloxacin were 2000, 1000, 500, 250, 125, 62.5, and 31.25 µg/mL.

Figure 7:
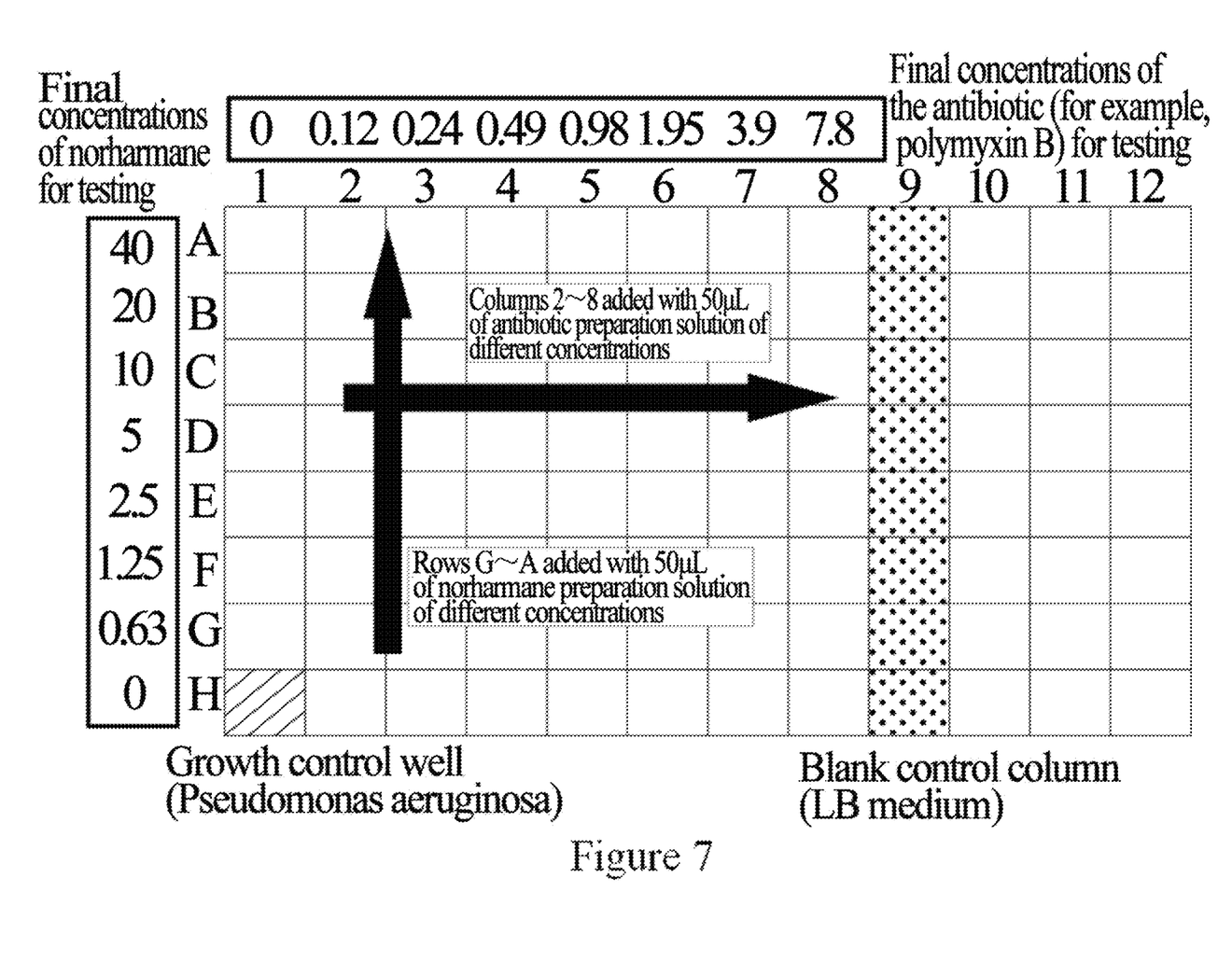
FIG. 7. Schematic diagram of drug adding in Example 1.

According to FIG. 7, each antibiotic is added into a 96-well plate, and 50 µL of the antibiotic solutions were drawn and added into wells in columns 2~8 of the %-well plate in the order of concentration from low to high, while the same amount of methanol instead of antibiotic was added into column 1. 50 µL of the norharmane solutions were drawn and added into wells in rows G~A of the 96-well plate in the order of concentration from low to high, while no norharmane was added into wells in row H. After the 96-well plate was left to stand to evaporate methanol completely, 200 µL of the *Pseudomonas aeruginosa* GDMCC No: 61027 bacterial solution ($2.6 \times 10^9$ CFU) were added into the wells in columns 1~8. Therefore, the final concentrations of norharmane were 40, 20, 10, 5, 2.5, 1.25, 0.63 and 0 µg/mL; the final concentrations of norharmane were polymyxin B is 7.8, 3.9, 1.95, 0.98, 0.49, 0.24, 0.12 and 0 µg/mL; the final concentrations of imipenem-cilastatin sodium were 2000, 1000, 500, 250, 125, 62.5, 31.25 and 0 µg/mL; the final concentrations of levofloxacin were 62.5, 31.25, 15.6, 7.8, 3.9, 1.95, 0.98 and 0 µg/mL; and the final concentrations of ofloxacin were 500, 250, 125, 62.5, 31.25, 15.6, 7.8 and 0 µg/mL. 200 µL of fresh LB medium were added to column 9. Wherein, well H1 is a growth control well, containing only bacterial solution and no drugs, and column 9 is a blank control containing only LB liquid medium. The prepared 96-well plate was placed in a constant temperature incubator at 37° C. for 24 h, and then $OD_{600}$ was measured with a microplate reader and the results were recorded. All experiments were repeated three times.

2.2 Evaluation Method and Result Judgment 2.2.1 Percentage of the Bacterial Growth Inhibition OD value of each well at 600 nm was measured with a microplate reader. And the percentage of the bacterial growth inhibition of each well was determined as Percentage of the bacterial growth inhibition (%) =

$$\frac{OD \text{ value of the growth control well} - OD \text{ value of a test well}}{OD \text{ value of the growth control well}} \times 100\%$$

2.2.2 Loewe Additivity Theory

Loewe additivity (LA) theory assumes that the drugs applied in combination have no interaction, i.e., null reference model. FICI method is the non-parametric method of LA theory, which can be expressed as:

$$\Sigma FIC = FIC_A + FIC_B = C_A/MIC_A + C_B/MIC_B$$

wherein $MIC_A$ and $MIC_B$ denote minimum inhibitory concentrations of two drugs A and B when used alone, respectively, and $C_A$ and $C_B$ denote concentration of drugs A and B in combination respectively while their combined effect is equal to the sum of their individual separate effects. $\Sigma FIC$ value of each well with percentage of the bacterial growth inhibition >80% were calculated, and in the $\Sigma FIC$ values obtained, if $\Sigma FICmax>4$, $FICI=\Sigma FICmax$; if $\Sigma FICmax<4$, $FICI=\Sigma FICmin$. If measured $FICI \leq 0.5$, they are synergistic; if $0.5<FICI \leq 4$, they are additive; if $FICI>4$, they are antagonistic.

2.2.3 Bliss Independence Theory

The Bliss independence (BI) theory also assumes that the drugs applied in combination have no interaction, i.e., nullreference model. The difference between the theoretical growth percentage and the experimental value (ΔE) under different concentration combination is used as the data analysis model, which can be expressed as:

$$\Delta E = E_A \times E_B - E_{(A \cdot B)}$$

wherein $E_A$ and $E_B$ denote growth percentage of each well where the two drugs A and B are used alone, and $E_{(A \cdot B)}$ denotes growth percentage of each well where the two drugs A and B are applied in combination. The ΔE values of the wells of the 96-well plate where the drug combination showed synergy or antagonism are added together and denoted as ΣSYN and ΣANT, respectively. If |ΣSYN+ΣANT|>100%, they are synergistic (the sum is positive) or antagonistic (the sum is negative); if |ΣSYN+ΣANT|<100%, they are additive.

3. Results 3.1 Results of the Effect of Norharmane Combined with Polymyxin B, Imipenem-Cilastatin Sodium, Levofloxacin or Ofloxacin on Drug-Resistant *Pseudomonas aeruginosa*

3.1.1 The Minimum Inhibitory Concentration of Norharmane Combined with Polymyxin B, Imipenem-Cilastatin Sodium, Levofloxacin or Ofloxacin The calculation method of the bacterial growth percentage in each well is:

Percentage of bacterial growth=($OD_{600}$ of each well–$OD_{600}$ of blank control well)/$OD_{600}$ of growth control well Percentages of bacterial growth in each well of the plate were calculated according to the above formula, and the lowest concentration of the combined drugs that could inhibit 80% of the bacterial growth as the end point.

When Norharmane is combined with polymyxin B, imipenem-cilastatin sodium, levofloxacin or levofloxacin, the results of the growth percentage experiment of drug-resistant *Pseudomonas aeruginosa* GDMCC No: 61027 in 96-well plates were shown in Table 1-Table 4.

TABLE 1

Growth percentage of drug-resistant *Pseudomonas aeruginosa* when norharmane was combined with polymyxin B shown by checkerboard pattern (the best combination of drugs converted by the FICI method is marked in bold font).

| | | Polymyxin B (μg/ml) | | | | | | | | |
|---|---|---|---|---|---|---|---|---|---|---|
| | | 0 | 0.12 | 0.24 | 0.49 | 0.98 | 1.95 | 3.9 | 7.8 | Blank |
| Norharmane (μg/ml) | 40 | 84% | 81% | 81% | 77% | 65% | 5% | 5% | 5% | 0% |
| | 20 | 95% | 83% | 81% | 80% | 70% | 5% | 5% | 5% | 0% |
| | 10 | 95% | 82% | 85% | 82% | 84% | 5% | 5% | 5% | 0% |
| | 5 | 95% | 93% | 90% | 89% | 85% | 5% | 5% | 5% | 0% |
| | 2.5 | 96% | 94% | 94% | 88% | 87% | 5% | 5% | 5% | 0% |
| | 1.25 | 96% | 96% | 95% | 96% | 87% | 5% | 5% | 5% | 0% |
| | 0.63 | 99% | 99% | 99% | 98% | 87% | 5% | 5% | 5% | 0% |
| | 0 | 100% | 100% | 98% | 98% | 90% | 52% | 29% | 5% | 0% |

TABLE 2

Growth percentage of drug-resistant *Pseudomonas aeruginosa* when norharmane was combined with imipenem-citastatin sodium shown by checkerboard pattern (the best combination of drugs converted by the FICI method is marked in bold font).

| | | Imipenem-citastatin sodium (μg/ml) | | | | | | | | |
|---|---|---|---|---|---|---|---|---|---|---|
| | | 0 | 31.25 | 62.5 | 125 | 250 | 500 | 1000 | 2000 | Blank |
| Norharmane (μg/ml) | 40 | 82% | 6% | 5% | 6% | 6% | 5% | 5% | 5% | 0% |
| | 20 | 85% | 12% | 5% | 6% | 6% | 5% | 5% | 5% | 0% |
| | 10 | 86% | 18% | 9% | 6% | 6% | 6% | 5% | 5% | 0% |
| | 5 | 87% | 27% | 10% | 6% | 6% | 6% | 5% | 5% | 0% |
| | 2.5 | 87% | 35% | 12% | 5% | 6% | 6% | 5% | 5% | 0% |
| | 1.25 | 92% | 40% | 15% | 6% | 6% | 6% | 5% | 5% | 0% |
| | 0.63 | 94% | 42% | 16% | 7% | 7% | 6% | 6% | 5% | 0% |
| | 0 | 100% | 71% | 70% | 54% | 37% | 34% | 23% | 6% | 0% |

TABLE 3

Growth percentage of drug-resistant *Pseudomonas aeruginosa* when norharmane was combined with levofloxacin shown by checkerboard pattern (the best combination of drugs converted by the FICI method is marked in bold font).

| | | Levofloxacin (μg/ml) | | | | | | | | |
|---|---|---|---|---|---|---|---|---|---|---|
| | | 0 | 0.98 | 1.95 | 3.9 | 7.8 | 15.6 | 31.25 | 62.5 | Blank |
| Norharmane (μg/ml) | 40 | 93% | 63% | 29% | 18% | 9% | 5% | 5% | 4% | 0% |
| | 20 | 95% | 76% | 75% | 56% | 18% | 5% | 5% | 4% | 0% |
| | 10 | 98% | 80% | 81% | 79% | 21% | 5% | 4% | 5% | 0% |

TABLE 3-continued

Growth percentage of drug-resistant *Pseudomonas aeruginosa* when norharmane was combined with levofloxacin shown by checkerboard pattern (the best combination of drugs converted by the FICI method is marked in bold font).

| | Levofloxacin (μg/ml) | | | | | | | | |
|---|---|---|---|---|---|---|---|---|---|
| | 0 | 0.98 | 1.95 | 3.9 | 7.8 | 15.6 | 31.25 | 62.5 | Blank |
| 5 | 92% | 81% | 83% | 79% | 36% | 6% | 5% | 5% | 0% |
| 2.5 | 94% | 85% | 85% | 81% | 42% | 7% | 5% | 5% | 0% |
| 1.25 | 94% | 91% | 88% | 84% | 68% | 8% | 4% | 5% | 0% |
| 0.63 | 98% | 91% | 90% | 85% | 73% | 8% | 5% | 5% | 0% |
| 0 | 100% | 91% | 89% | 85% | 72% | 42% | 26% | 5% | 0% |

TABLE 4

Growth percentage of drug-resistant *Pseudomonas aeruginosa* when norharmane was combined with ofloxacin shown by checkerboard pattern.

| | | Ofloxacin (μg/ml) | | | | | | | | |
|---|---|---|---|---|---|---|---|---|---|---|
| | | 0 | 7.8 | 15.6 | 31.25 | 62.5 | 125 | 250 | 500 | Blank |
| Norharmane (μg/ml) | 40 | 81% | 59% | 49% | 49% | 48% | 42% | 6% | 6% | 0% |
| | 20 | 88% | 69% | 67% | 62% | 62% | 51% | 6% | 6% | 0% |
| | 10 | 94% | 73% | 70% | 68% | 65% | 51% | 15% | 6% | 0% |
| | 5 | 95% | 75% | 72% | 68% | 69% | 53% | 18% | 6% | 0% |
| | 2.5 | 97% | 72% | 71% | 78% | 70% | 57% | 20% | 6% | 0% |
| | 1.25 | 98% | 78% | 77% | 77% | 85% | 59% | 19% | 6% | 0% |
| | 0.63 | 99% | 88% | 89% | 79% | 85% | 58% | 28% | 6% | 0% |
| | 0 | 100% | 83% | 79% | 73% | 67% | 54% | 36% | 6% | 0% |

3.1.2 Evaluate the Effect of Norharmane when Combined with Polymyxin B, Imipenem-Cilastatin Sodium, Levofloxacin or Ofloxacin by FICI Method and ΔE Method The evaluation index of FICI method is FICI value, and FICI≤0.5 is defined as synergy. It can be seen from Table 5 that when norbornane is combined with polymyxin B, imipenem-cilastatin sodium or levofloxacin, the FICI value of each combination is less than 0.5, showing a synergistic effect. When Norharmane is combined with ofloxacin, the FICI value is greater than 0.5, showing an additive effect on drug-resistant *Pseudomonas aeruginosa*.

The evaluation index of the ΔE method is ΣSYN+ΣANT. It can be seen from Table 5 that when norharmane is combined with polymyxin B, imipenem-cilastatin sodium or levofloxacin, ΣSYN+ΣANT in each combination is greater than 100%, showing a synergistic effect. When Norharmane is combined with ofloxacin, the value of |ΣSYN+ΣANT| is less than 100%, showing an additive effect.

TABLE 5

Evaluation of the antibacterial effect of norharmane in combination with polymyxin B, imipenem-cilastatin sodium, levofloxacin or ofloxacin by FICI method and ΔE method

| Drugs in combination | MIC (μg/mL) | | | | FICI | | ΔE | | |
|---|---|---|---|---|---|---|---|---|---|
| | $MIC_A$ | $C_A$ | $MIC_B$ | $C_B$ | FICI | Effect | ΣSYN | ΣANT | Effect |
| Nor + Pol | 40 | 0.63 | 7.8 | 1.95 | 0.266 | Synergy | 190.43% | −9.19% | Synergy |
| Nor + Imi | 40 | 0.63 | 2000 | 62.5 | 0.047 | Synergy | 489.90% | 0.00% | Synergy |
| Nor + Lev | 40 | 0.63 | 62.5 | 15.6 | 0.266 | Synergy | 171.23% | −12.40% | Synergy |
| Nor + Ofl | 40 | 1.25 | 500 | 250 | 0.531 | Additive | 16.83% | −20.05% | Additive |

Note:
Nor: norharmane; Pol: polymyxin B; imi- Imipenem-cilastatin sodium; Lev: levofloxacin; Ofl: ofloxacin; MIC: minimum inhibitory concentration; $MIC_A$: minimum inhibitory concentration of a drug used alone; $C_A$: minimum inhibitory concentration of norharmane in combination with other drug; $MIC_B$: minimum inhibitory concentration of the antibiotic when used alone; $C_B$: the minimum inhibitory concentration of the antibiotic when applied in combination; FICI: Fractional Inhibitory Concentration Index; ΣSYN: the sum of all the positive ΔE values in the 96-well plate; ΣANT: the sum of all the negative ΔE values in the 96-well plate.

Figure 1:
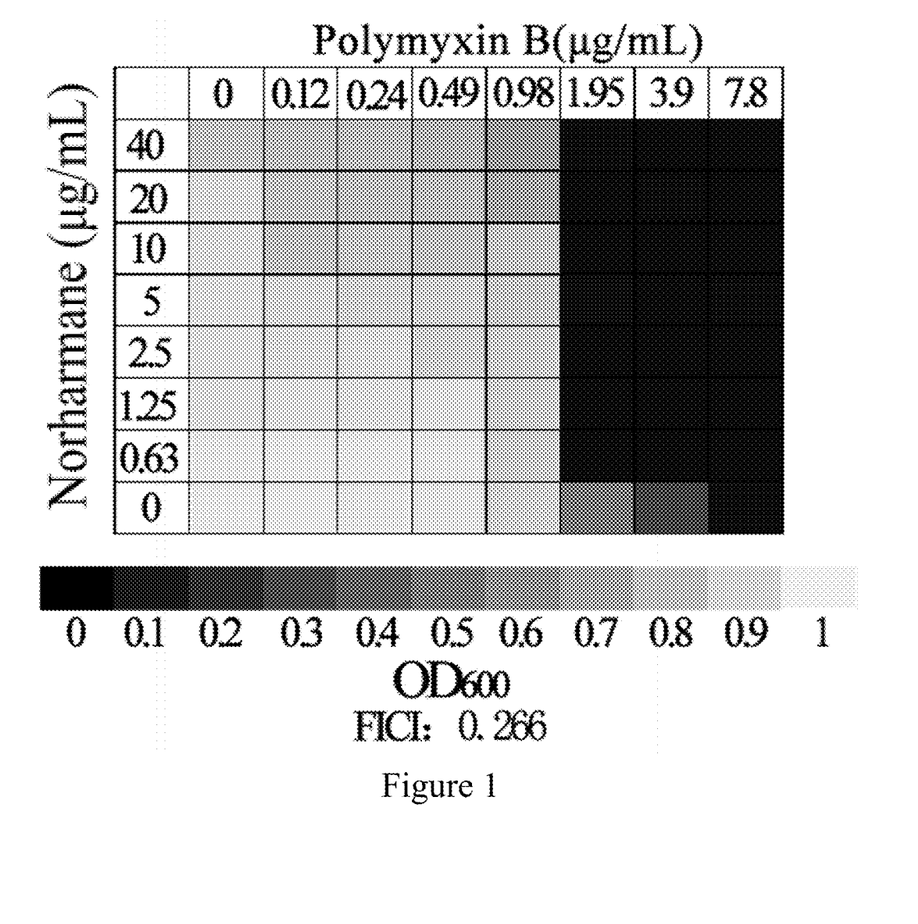
FIG. 1. Evaluation of combination of norharmane and polymyxin B by FICI method.
Figure 2:
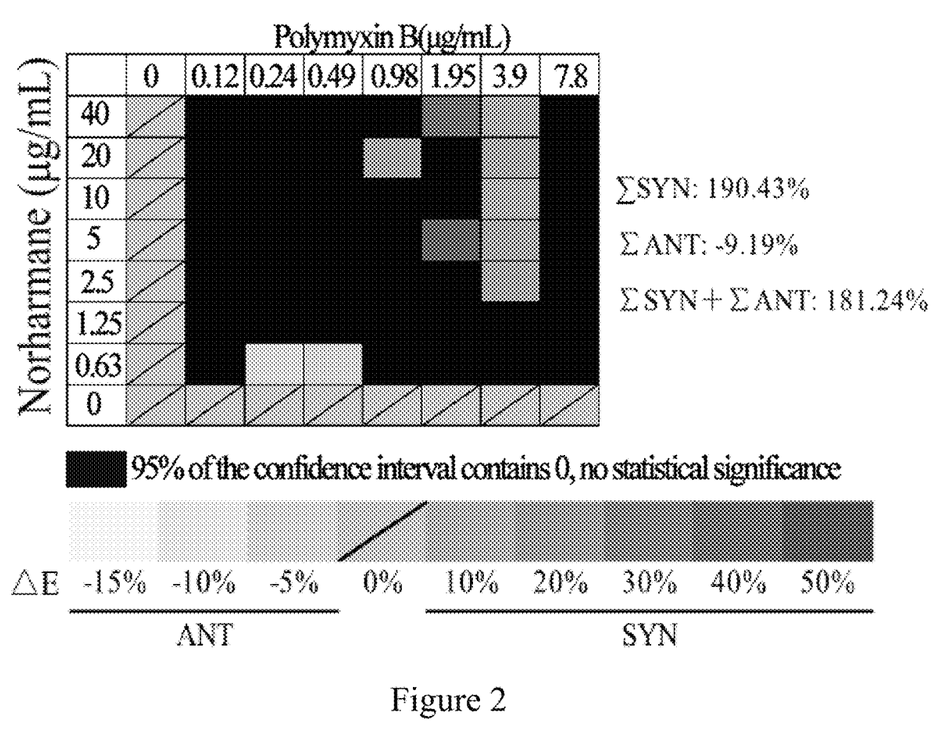
FIG. 2. Evaluation of combination of norharmane and polymyxin B by ΔE method.
Figure 3:
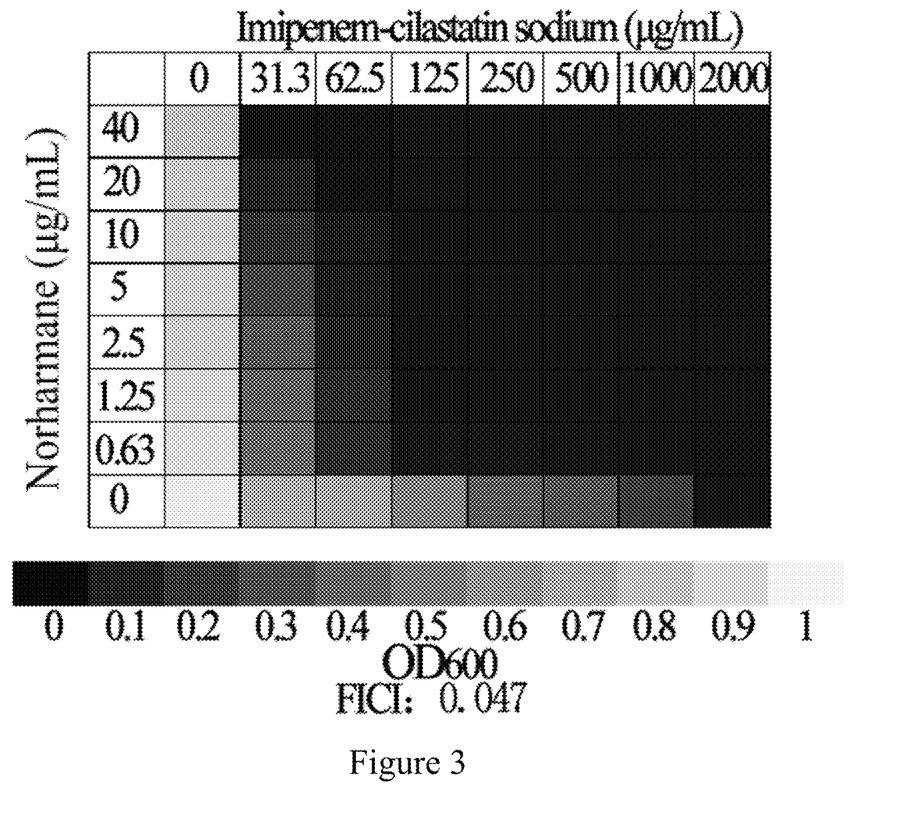
FIG. 3. Evaluation of combination of norharmane and imipenem-cilastatin sodium by FICI method.
Figure 4:
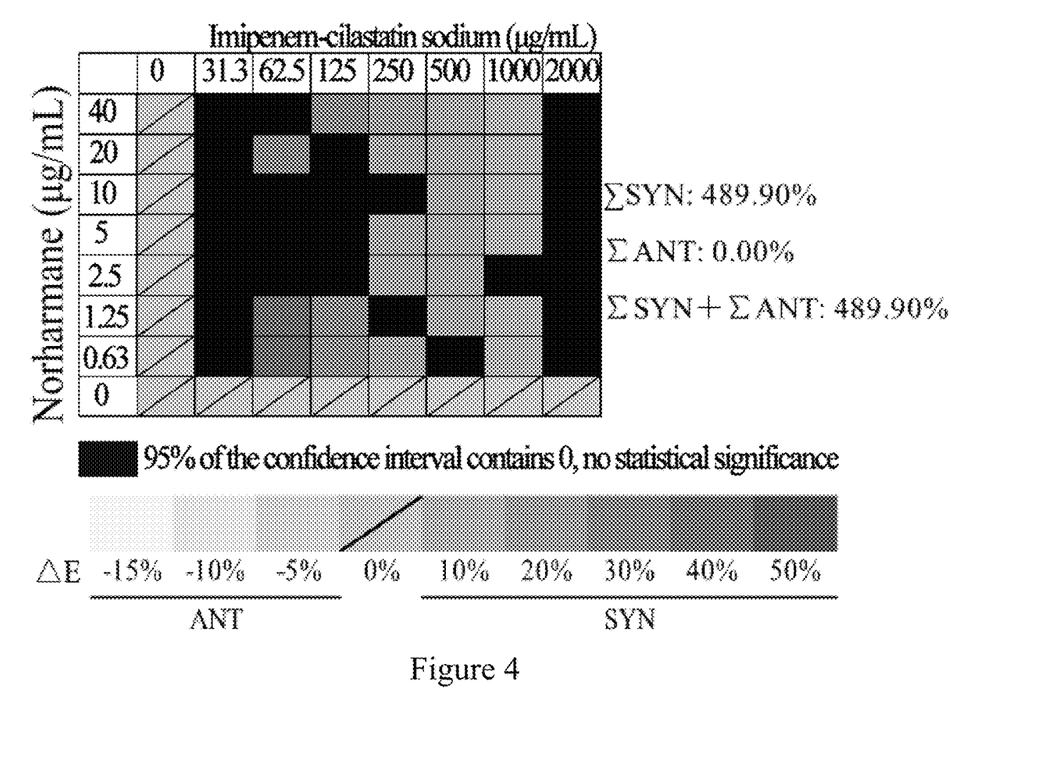
FIG. 4. Evaluation of combination of norharmane and imipenem-cilastatin sodium by ΔE method.
Figure 5:
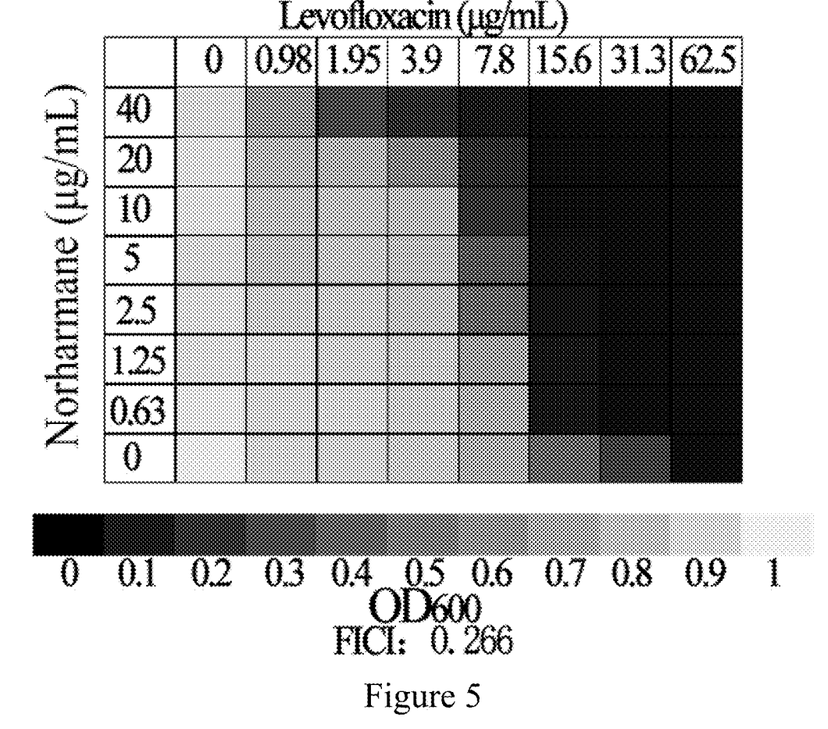
FIG. 5. Evaluation of combination of norharmane and levofloxacin by FICI method.
Figure 6:
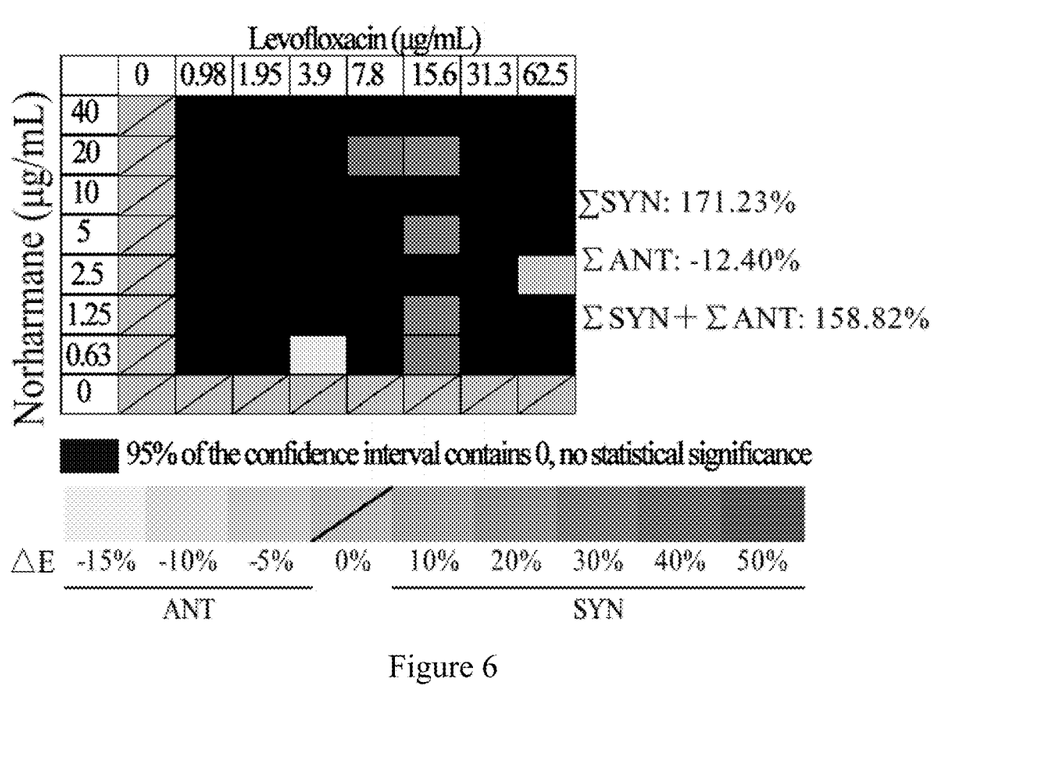
FIG. 6. Evaluation of combination of norharmane and levofloxacin by ΔE method.

The evaluation diagrams of the combined effect of norharmane and polymyxin B by FICI method and ΔE method were shown in FIG. 1 and FIG. 2; the evaluation diagrams of the combined effect of norharmane and imipenem-cilastatin sodium by FICI method and ΔE method were shown in FIG. 3 and FIG. 4; and the evaluation diagrams of the combined effect of norharmane and levofloxacin by FICI method and ΔE method were shown in FIG. 5 and FIG. 6. It can be seen from the figures that norharmane has a synergistic effect with different antibiotics. These figures are consistent with the above value analysis.

Although the above has illustrated the examples of the present invention in conjunction with the drawings, the scope of the present invention is not limited thereto. Based on the technical solution of the present invention, all the changes, modifications substitutions, simplifications and applications made by any technical person familiar with the technology without creative labor should be equivalent replacement conditions and should be involved in the scope of protection of the present invention.

The invention claimed is:

1. An application of norharmane and an antibiotic in preparing an antibacterial drug, wherein the antibiotic selected from one of polymyxin B, imipenem-cilastatin sodium and levofloxacin, and a strain of the bacteria is drug-resistant *Pseudomonas aeruginosa* the minimum inhibitory concentrations respectively of norharmane and polymyxin B in combination are 0.63 pg/mL and 1.95 pg/mL, wherein the minimum inhibitory concentrations respectively of norharmane and imipenem- cilastatin sodium in combination are 0.63 pg/mL and 62.5 pg/mL and wherein the minimum inhibitory concentrations respectively of norharmane and levofloxacin in combination are 0.63 pg/mL and 15.6 pg/mL.

2. The application as claimed in claim 1, wherein the strain of the bacteria is drug-resistant *Pseudomonas aeruginosa* C218, which is preserved in Guangdong Microbial Culture Collection Center, preservation number is GDMCC No: 61027, and preservation date is May 13, 2020.

SEQUENCE LISTING

```
<160> NUMBER OF SEQ ID NOS: 1

<210> SEQ ID NO 1
<211> LENGTH: 1305
<212> TYPE: DNA
<213> ORGANISM: Pseudomonas aeruginosa

<400> SEQUENCE: 1
ccttgcggtt agactagcta cttctggagc aacccactcc catggtgtga cgggcggtgt      60
gtacaaggcc cgggaacgta ttcaccgtga cattctgatt cacgattact agcgattccg     120
acttcacgca gtcgagttgc agactgcgat ccggactacg atcggtttta tgggattagc     180
tccacctcgc ggcttggcaa ccctttgtac cgaccattgt agcacgtgtg tagccctggc     240
cgtaagggcc atgatgactt gacgtcatcc ccaccttcct ccggtttgtc accggcagtc     300
tccttagagt gcccacccga ggtgctggta actaaggaca agggttgcgc tcgttacggg     360
acttaaccca acatctcacg acacgagctg acgacagcca tgcagcacct gtgtctgagt     420
tcccgaaggc accaatccat ctctggaaag ttctcagcat gtcaaggcca ggtaaggttc     480
ttcgcgttgc ttcgaattaa accacatgct ccaccgcttg tgcgggcccc cgtcaattca     540
tttgagtttt aaccttgcgg ccgtactccc caggcggtcg acttatcgcg ttagctgcgc     600
cactaagatc tcaaggatcc caacggctag tcgacatcgt ttacggcgtg gactaccagg     660
gtatctaatc ctgtttgctc cccacgcttt cgcacctcag tgtcagtatc agtccaggtg     720
gtcgccttcg ccactggtgt tccttcctat atctacgcat ttcaccgcta cacaggaaat     780
tccaccaccc tctaccgtac tctagctcag tagttttgga tgcagttccc aggttgagcc     840
cggggatttc acatccaact tgctgaacca cctacgcgcg ctttacgccc agtaattccg     900
attaacgctt gcacccttcg tattaccgcg gctgctggca cgaagttagc cggtgcttat     960
tctgttggta acgtcaaaac agcaaggtat taacttactg cccttcctcc caacttaaag    1020
tgctttacaa tccgaagacc ttcttcacac acgcggcatg gctggatcag gctttcgccc    1080
attgtccaat attccccact gctgcctccc gtaggagtct ggaccgtgtc tcagttccag    1140
tgtgactgat catcctctca gaccagttac ggatcgtcgc cttggtaggc ctttacccca    1200
ccaactagct aatccgacct aggctcatct gatagcgtga ggtccgaaga tccccactt    1260 tctccctcag gacgtatgcg gtattagcgc ccgtttccgg acgtt               1305
```

3. The application as claimed in claim 1, wherein the volume of the antibiotic calculated by the weight of the norharmane is 2-16 mL/μg.

\* \* \* \* \*